April 2, 1974 E. J. ALEXANDER, JR., ET AL Re. 27,959

BEVERAGE BREWING APPARATUS

Original Filed July 7, 1967

Inventors:-
Edwin J. Alexander, Jr.,
Harvey R. Karlen.
By Hofgren, Wegner, Allen, Stellman & McCord Attys.

United States Patent Office

Re. 27,959
Reissued Apr. 2, 1974

27,959
BEVERAGE BREWING APPARATUS

Edwin J. Alexander, Jr., Evanston, and Harvey R. Karlen, Chicago, Ill., assignors to Cory Corporation Original No. 3,502,017, dated Mar. 24, 1970, Ser. No. 800,352, Feb. 10, 1969, which is a continuation of abandoned application Ser. No. 651,813, July 7, 1967. Application for reissue Feb. 11, 1972, Ser. No. 225,682
Int. Cl. A23f; A47j *31/00*
U.S. Cl. 99—295 25 Claims

Matter enclosed in heavy brackets [ ] appears in the original patent but forms no part of this reissue specification; matter printed in italics indicates the additions made by reissue.

ABSTRACT OF THE DISCLOSURE

A beverage brewing apparatus having a brewing chamber in which is removably disposed a filter bag charge package and a supply means for delivering brewing liquid to the chamber to brew the beverage within the bag. The apparatus includes means for discharging the brewed beverage from the chamber.

This application is a continuation of application No. 651,813, filed July 7, 1967, now abandoned.

This invention relates to beverage brewing apparatus and in particular to apparatus for providing a beverage from a packaged charge of brew ingredient.

In one form of beverage brewing apparatus, coffee is brewed by delivering hot water downwardly into a brewing chamber to form the coffee beverage therein and to be discharged through a suitable discharge spout by a flow upwardly from the chamber and outwardly through the spout. An excellent example of such a brewer is that shown in the Karlen Patent No. 2,554,367, owned by the assignee hereof. The present invention comprehends an improvement in such a beverage brewer whereby the brewer is arranged to utilize a coffee filter bag package in lieu of a loose charge of coffee as utilized in the apparatus of the indicated patent.

A problem arises in the utilization of an "upside down" type beverage brewer, such as disclosed in the Karlen patent, with a filter bag coffee package of the conventional type as the brewer as disclosed in the patent includes a water delivery tube extending downwardly through the center of the brewing chamber to adjacent the bottom thereof for delivering the hot water into the lower portion of the chamber for flow upwardly through the coffee grounds and outwardly through the discharge spout at the top of the chamber. The present invention comprehends an unexpected novel delivery of the hot water to flow into the bag package, effect the brewing of the coffee therein, and flow outwardly in the form of brewed beverage to the discharge spout at the top of the chamber. Thus, in the present "upside down" type brewer, a conventional "pillow pack" type coffee package may be utilized to provide an improved facilitated coffee brewing operation.

Thus, a principal feature of the present invention is the provision of a new and improved beverage brewing apparatus.

Another feature of the invention is the provision of such an apparatus for providing a beverage from a packaged charge of brew ingredients in a liquid-passing, expansible container.

Still another feature of the invention is the provision of such an apparatus having new and improved means for effecting an "upside down" brewing of the beverage wherein the brewed beverage is caused to flow upwardly from the beverage ingredient material to a discharge at the upper end of the brewing chamber.

A yet further feature of the invention is the provision of such an apparatus including receptacle means defining a brewing chamber for removably holding a packaged charge of brew ingredients in a liquid-passing, expansible container and having an outlet, flow passage means having a delivery portion arranged to open to said chamber at the top of the packaged charge in said chamber, and means for delivering brewing liquid through said flow passage delivery portion into the container of the packaged charge to form a beverage therefrom, said receptacle means being preselected to constrain the packaged charge to expand the container against said delivery portion as a result of liquid flow into the container thereby to effectively seal the delivery portion to the container and cause substantially all of the delivered brewing liquid to flow into the container and cause the formed beverage to flow outwardly through the container to the outlet.

Another feature of the invention is the provision of such an apparatus including new and improved means for delivering the beverage brewing liquid through the container of the packaged charge for brewing the beverage within the container and permitting the brewed beverage to move outwardly through the container to the outlet.

A yet further feature of the invention is the provision of such a brewing apparatus wherein the delivery portion of the flow passage means comprises a tubular duct terminating at the top of the bagged charge.

Another feature of the invention is the provision of such a brewing apparatus wherein the receptacle is arranged to constrain the charge whereby water entering into the container causes an expansion of the charge therein to cause the container to seal against the delivery portion of the flow passage means and effect relatively positive flow of substantially all brewing liquid into the package for brewing of the beverage therein.

A further feature of the invention is the provision of such a brewing apparatus having means for providing facilitated installation and removal of the packaged charge relative to the brewing chamber.

Other features and advantages of the invention will be apparent from the following description taken in connection with the accompanying drawing wherein.

Figure 1:
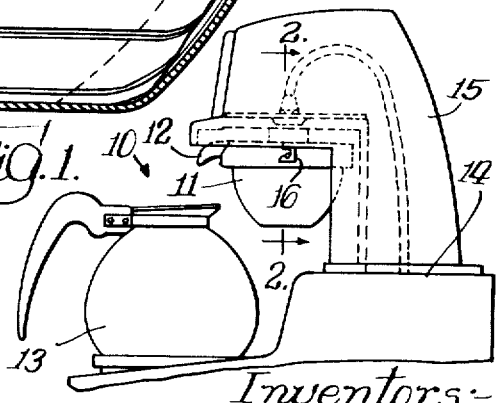
FIGURE 1 is a fragmentary side elevation with portions thereof shown in vertical section of a beverage brewing apparatus embodying the invention.

In the exemplary embodiment of the invention as disclosed in the drawing, a beverage brewing apparatus generally designated 10 is shown to comprise a brewing cartridge 11 in which a beverage such as coffee is brewed and delivered from a spout 12 thereof into a subjacent receiver such as decanter 13. The brewing of the beverage in cartridge 11 is effected by delivering brewing liquid, such as hot water, thereto from a suitable supply 14 into the top of the cartridge 11 and downwardly therethrough to effect a brewing within the cartridge below the level of spout 12. The brewed beverage is permitted to flow upwardly from the brewing chamber and outwardly through the spout 12, the upward flow of the brewed beverage from the brewing chamber herein being described as an "upside down" brewing operation. As shown in FIGURE 1, the apparatus 10 may include an upper housing portion 15 carrying suitable brackets 16 for removably mounting the cartridge 11 in a brewing position thereon.

Figure 2:
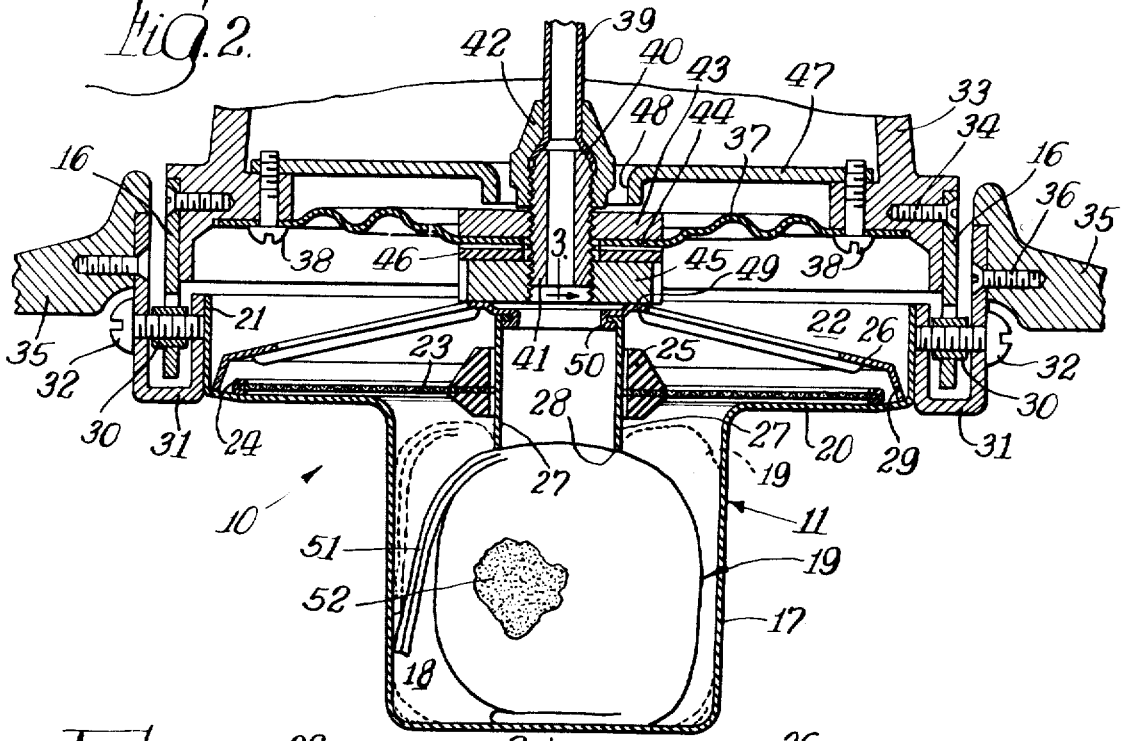
FIGURE 2 is a fragmentary enlarged vertical section taken substantially along the line 2—2 of FIGURE 1.
Figure 3:
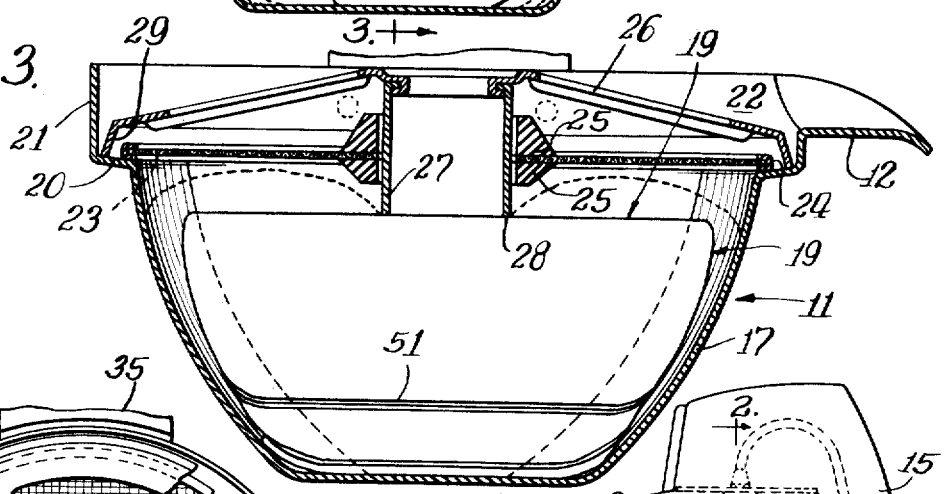
FIGURE 3 is a diametric section taken substantially along the line 3—3 of FIGURE 2.
Figure 4:
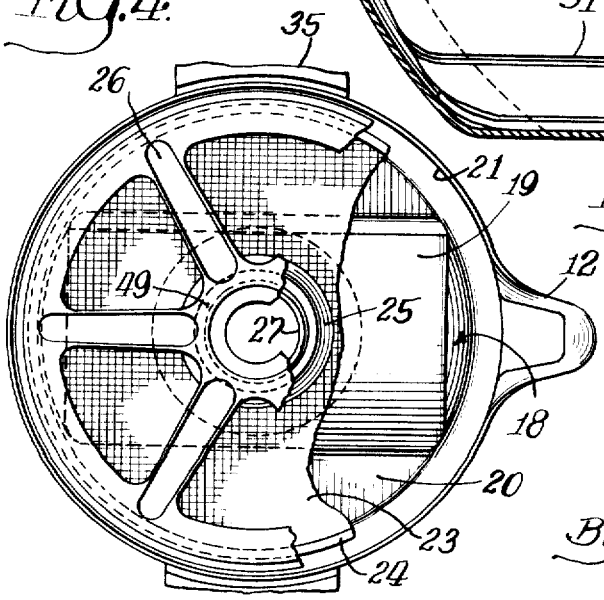
FIGURE 4 is a fragmentary plan view with portions broken away of the structure of FIGURE 3.

As indicated briefly above, in describing the invention, the apparatus 10 will be described as a coffee brewing apparatus, it being understood that other suitable beverages may be similarly brewed therein. Referring to FIGURES 2 through 4, the cartridge 11 includes a bowl 17 defining a brewing chamber 18 in which is received a "pillow pack" coffee filter bag package 19. As shown in FIGURE 2, the width of the chamber 18 is slightly greater than that of the package 19 and the length thereof is slightly greater than the length of the package 19 to permit facilitated installation of the package in the bowl 17. The bowl 17 includes an outturned upper wall portion 20 and an upstanding rim 21 defining a delivery space 22 at the top of the brewing chamber 18. The spout 12 opens from the space 22 as shown in FIGURE 3. A filter screen 23 is provided with an annular outer sealing ring 24 and an inner annular bushing 25. The sealing ring 24 rests on the wall portion 20 with the bushing 25 at the center of the cartridge. A filter frame 26 is provided with a central depending hot water delivery tube 27 extending sealingly through bushing 25 and having a rounded lower end 28 for engaging the package 19. The frame 26 includes a downturned rim 29 which rests on the wall portion 20 of the bowl 17.

The cartridge 11 is supported by a pair of roller trunnions 30 carried in brackets 31 secured to the rim 21 by suitable means such as crews 32. As illustrated in FIGURE 2, brackets 16 may be secured to the head portion 33 of the housing 15 by suitable means such as screws 34. The cartridge 11 may be provided with suitable handles 35 on the opposite sides thereof secured by means such as crews 36 to the bracket 31.

A deflectable diaphragm 37 is secured to the housing portion 33 by suitable means such as screws 38. Hot water is delivered from supply 14 through a duct 39 having a flared delivery end 40 into which is fitted the upper end of a bushing 41. A sleeve 42 is threaded onto the bushing 41 to secure the bushing to the duct end 40. A nut 43 is threaded onto the bushing above the mid-portion 44 of the diaphragm 37, and a sealing member 45 is threaded onto the lower end of the bushing below the diaphragm mid-portion 44. A sealing washer 46 is disposed between the sealing member 45 and the diaphragm portion 44, as shown in FIGURE 2.

A bridge 47 is secured to the housing portion 33 by screws 38 and includes an annular central depending flange 48 overlying the nut 43. The resiliency of the diaphragm 37 urges the sealing member 45 against an annular upper edge portion 49 of the frame 26. The delivery duct 27 is sealingly secured to an inner annular portion 50 of the frame thereby to complete a sealed connection of the tube 27 to the sealing member 45.

In the illustrated embodiment, the package 19 comprises a bag 51 formed of a suitable material such as filter paper and holds a preselected quantity of brew ingredient, such as ground coffee 52. The filter paper permits the passing of liquid therethrough, and the bag is relatively large and suitably folded so as to be expansible when water enters the interior thereof to brew the coffee. Thus, the package 19 may comprise the commercially available conventional "pillow pack" package.

The use of apparatus 10 is extremely simple. With the cartridge 11 removed from the supports 16 and with the frame 26 and filter screen 23 removed from the bowl 17, the user firstly installs the package 19 in the chamber 18. Screen 23 and frame 26 are then reinstalled on wall portion 20 as shown in FIGURE 3, whereby the smooth, large diameter (herein approximately 1 inch) lower end 28 of the duct 27 is disposed at the top of the package 19. The cartridge is then installed on the bracket 16 whereby the frame portion 49 is brought into sealing engagement with the seal member 45 to complete a flow passage from the hot water supply 14 to the chamber 18. Delivery of hot water is then suitably effected whereby the hot water flows into the upper portion of the package 19 through the paper bag 51. Delivery of the hot water into the bag causes the bag to expand to be urged upwardly about the end 28 of the delivery tube 27 to effective seal the bag to the tube end and cause substantially all further hot water delivered through the tube 27 to enter directly through the paper bag into the package 19 for berwing the coffee therein. At the same time, the bag expands to completely fill the lower portion of chamber 18. Thus, the brewed coffee beverage may flow upwardly through the paper bag 51, through the screen 23 and outwardly from the cartridge over the discharge spout 12 to the subjacent decanter 13.

After brewing the desired amount of coffee, the hot water delivery is terminated. The cartridge 11 is then removed from the apparatus 10 whereupon the frame 26 and screen 23 are removed to permit the further removal of the spent package for discarding the same as desired. As the package 19 is expanded to substantially fill the chamber 18 to the position shown in dotted lines in FIGURE 2 during the brewing operation, the discarding of the spent package 19 effectively removes substantially all liquid from the cartridge. Further, as the coffee grounds are retained within the bag 51, there is no need to clean the interior of the bowl 17 between successive coffee brewing operations. Thus, apparatus 10 may be utilized in conjunction with a hot water supply line remote from a sink or similar washing means as the successive brewing operations may be effected solely by discarding the spent package into a waste basket and replacing the same with a fresh package for conducting the subsequent brewing operation.

The "pillow pack" package 19 is placed in the chamber 18 by first shaking the package while hand held to cause the ground coffee to settle to the bottom thereof and then folding over the excess paper with the continuous paper seam on the inside to maintain the double thicknesses of paper below the top of the package as shown in FIGURE 2. Thus, the brewed coffee is permitted to flow readily from the package 19 through the single thickness of the paper bag at the top portion thereof during the brewing operation, should the bag 51 inadvertently be broken during the brewing operation, the screen 23 will prevent flow of grounds outwardly with the brewed coffee through the discharge spout 12. As a substantial expansion of the bag occurs during the brewing operation, variations in the dimensions of the package 19 corresponding to variations in the weight of the ground coffee therein do not preclude the effective sealing of the upper portion of the bag to the tube end 28, as shown in dotted lines in FIGURE 2.

While we have shown and described one embodiment of our invention, it is to be understood that it is capable of many modifications.

We claim:

1. In an apparatus for providing a beverage from a packaged charge of brew ingredients in a liquid-passing, expansible container, receptacle means defining a brewing chamber for removably holding the package charge and having an outlet, flow passage means having a delivery portion arranged to open to said chamber adjacent a preselected portion of the package charge in said chamber, said outlet being in communication with a brew chamber portion adjacent said delivery chamber, and means for delivering brewing liquid through said flow passage delivery portion into the container of the packaged chamber to form a beverage therefrom, said receptacle means being preselected to constrain the packaged charge to extend the container against said delivery portion as a result of liquid flow into the container thereby to effectively seal the delivery portion to the container and cause substantially all of the delivered brewing liquid to flow into the container and cause the formed beverage to flow outwardly through the container adjacent said delivery portion to said outlet.

2. The beverage providing apparatus of claim 1 wherein said outlet opens to an upper portion of said chamber.

3. The beverage providing apparatus of claim 1 wherein said deliver portion extends downwardly into the upper portion of said chamber.

4. The beverage providing apparatus of claim 1 wherein the container is formed of paper.

5. The beverage providing apparatus of claim 1 wherein the container comprises a bag.

6. The beverage providing apparatus of claim 1 wherein said delivery portion has a diameter of at least approximately 1 inch.

7. The beverage providing apparatus of claim 1 wherein said delivery portion comprises a duct having an annular distal end engaging the container.

8. The beverage providing apparatus of claim 1 including means for removably supporting said receptacle means in association with the means for delivering brewing liquid.

9. The beverage providing apparatus of claim 1 wherein said receptacle means is provided with an upper open end and a discharge spout for discharging brewed beverage from said chamber.

10. The beverage providing apparatus of claim 1 wherein said receptacle means is separable from said delivery portion of said flow passage means for facilitated installation and removal of the packaged charge relative to said chamber.

11. The beverage providing apparatus of claim 1 wherein said delivery portion is smooth to preclude puncturing of the packaged charge container.

12. The beverage providing apparatus of claim 1 wherein the packaged charge has a horizontal cross section only slightly less than that of said chamber whereby a small expansion thereof causes said packaged charge to substantially fill the chamber inwardly of the delivery portion of the flow passage means.

13. The beverage providing apparatus of claim 1 wherein said delivery portion opens to said chamber at the top of the packaged charge therein.

14. In an apparatus for providing brewed coffee from a packaged charge of ground coffee in a permeable bag, receptacle means having a bottom wall defining a brewing chamber for removably holding the packaged charge on said bottom wall and having an outlet, flow passage means having a delivery portion arranged to open adjacent the packaged charge in said chamber, said delivery portion being disposed to be closer to the confronting portion of the packaged charge bag than said confronting portion is to said bottom wall when the charge is placed in said brewing chamber prior to the delivery of hot water thereto, and means for delivering hot water through said flow passage delivery portion into the packaged charge bag to brew coffee therein, said bottom wall being maintained in a preselected spaced relationship to said inlet portion thereby to support the packaged charge and cause expansion of the bag against said delivery portion of the flow passage means as a result of the flow of hot water into the charge in the bag thereby to effectively seal the delivery portion to the bag and cause substantially all of the delivered hot water to flow into the bag and cause the brewed coffee to flow outwardly from the bag to said outlet.

15. The coffee brewing apparatus of claim 14 wherein said bag is formed of paper.

16. The coffee brewing apparatus of claim 14 wherein said receptacle means has a side wall generally conforming to the lateral configuration of the bag, whereby the expansion of the bag causes the bag to expand laterally and urge its sides substantially fully against said receptacle side wall.

17. The coffee brewing apparatus of claim 14 wherein said outlet is provided with foraminous screen for filtering substantially all of the outwardly flowed brewed coffee therethrough, said screen being spaced from said packaged charge at all times.

18. The coffee brewing apparatus of claim 14 wherein upper wall means extends across the top of said chamber and said passage means extends downwardly through said wall means with said delivery portion projecting to below the level of said upper wall means.

19. The coffee brewing apparatus of claim 18 wherein said upper wall means comprises a foraminous wall means.

20. The coffee brewing apparatus of claim 14 wherein said delivery portion of the delivery means projects toward the packaged charge to have substantially immediate sealing engagement by said confronting portion of the bag upon introduction of hot water therethrough to said bag causing the bag to swell.

*21. A brewing apparatus for a packaged formed of filter material and containing a measured amount of coffee, said apparatus comprising:*

*tubular forming a downwardly facing annular surface;*

*a hot water delivery head at the upper end of the tubular means having an outlet substantially smaller in diameter than that of the tubular means and opening coaxially into the tubular means for delivering hot water coaxially downwardly through said surface;*

*means for supporting a coffee brewing vessel under said surface; and*

*a container dimensioned to receive said package and place the upper end surface thereof in confronting relation to said head and said downwardly facing surface, whereby on wetting the coffee contained in said package, said coffee swells and the upper surface of said package engages said downwardly facing surface thereby to form a seal indirectly to said delivery head.*

*22. The brewing apparatus of claim 21 wherein said container is spaced laterally from said annular surface to extend adjacent the sides of the package therein whereby hot water delivered downwardly through the annular surface is guided by said container into the package through the side thereof prior to the package swelling into sealed engagement with said surface.*

*23. The brewing apparatus of claim 21 wherein the container is provided with curved wall portions defining an upwardly widening chamber receiving said package.*

*24. The brewing apparatus of claim 21 wherein a foraminous wall is disposed to extend radially outwardly from said tubular means for controlling liquid flow upwardly from about said annular surface.*

*25. The brewing apparatus of claim 21 wherein said container includes a lower portion receiving said package and an upper, laterally enlarged portion for passing the brewed coffee upwardly from said package in said lower portion around said tubular means.*

References Cited

The following references, cited by the Examiner, are of record in the patented file of this patent or the original patent.

UNITED STATES PATENTS

| | | | |
|---|---|---|---|
| 3,561,349 | 2/1972 | Endo. | |
| 2,554,367 | 5/1951 | Karlen | 99—307 X |
| 2,620,088 | 12/1952 | Tellonder | 99—303 |
| 3,030,874 | 4/1962 | Fiori | 99—295 X |
| 3,086,447 | 4/1963 | Arnett | 99—295 |
| 3,384,004 | 5/1968 | Perlman | 99—295 X |

ROBERT W. JENKINS, Primary Examiner

U.S. Cl. X.R.

99—302